United States Patent [19]
Furutake

[11] Patent Number: 5,982,559
[45] Date of Patent: Nov. 9, 1999

[54] IMMERSION MICROSCOPE OBJECTIVE LENS SYSTEM

[75] Inventor: Naoki Furutake, Kawasaki, Japan

[73] Assignee: Nikon Corporation, Tokyo, Japan

[21] Appl. No.: 09/014,410

[22] Filed: Jan. 27, 1998

[30] Foreign Application Priority Data

Jan. 28, 1997 [JP] Japan ..................................... 9-027321
Oct. 2, 1997 [JP] Japan ..................................... 9-284294

[51] Int. Cl.$^6$ .................................................. G02B 21/02
[52] U.S. Cl. .......................................................... 359/656
[58] Field of Search .................................. 359/656, 657, 359/658, 660, 661, 659

[56] References Cited

U.S. PATENT DOCUMENTS 4,666,256  5/1987  Shimizu et al. ........................ 359/658
5,532,878  7/1996  Suenaga et al. ........................ 359/657
5,798,869  8/1998  Watanabe ................................ 359/658

Primary Examiner—Scott J. Sugarman
Attorney, Agent, or Firm—Michael N. Meller

[57] ABSTRACT

The immersion microscope objective lens system of the present invention provides a numerical aperture of 1.3, a magnification of 40×, a planatic image field even in the wide field of view and appropriately compensates for all aberrations. The immersion microscope objective lens system of the present invention comprises a structure including a plurality of lens groups G1 through G8 arranged along a common optical axis wherein the first lens group G1 from the object side of the lens system includes a planoconvex lens and a meniscus lens cemented to the planoconvex lens with its convex surface facing toward the image side of the lens system and wherein the second lens group G2 includes two positive meniscus lenses having convex surfaces facing toward the object side of the lens system and wherein the following condition is fulfilled: that n2 is larger than 1.70 where n2 is the refractive index in relation to the "d" line of the meniscus lens of the first lens group G1 ($\lambda$=587.6 nm).

15 Claims, 3 Drawing Sheets

IMMERSION MICROSCOPE OBJECTIVE LENS SYSTEM

FIELD OF THE INVENTION

The present invention relates to an immersion microscope objective lens system and more particularly to an immersion microscope objective lens system which can be used for fluorescence observations. The immersion microscope objective lens system of the present invention has a remarkably large numerical aperture (NA).

BACKGROUND OF THE INVENTION

The resolution power of a lens is directly proportional to the lens' numerical aperture. Microscope objective lenses having large numerical apertures have been designed and developed in order to improve resolution power. It is usually very difficult to design microscope objective lenses having the same numerical aperture with substantially different lens magnifications.

The above design problem becomes even more problematic when the lens requires an almost constant field of view independent of magnification, as in the case of an immersion microscope objective lens. It is also more difficult to design an anastigmatic low magnification objective lens system having a large numerical aperture. For example, a 40× objective with a NA of 1.3 has a larger NA on the image side than a 60× which has a NA of 1.4. Therefore, the 40× objective is more difficult to design.

SUMMARY OF THE INVENTION

The present invention is an immersion microscope objective lens system suitable for fluorescence observations wherein aberrations are appropriately compensated with a numerical aperture of 1.3, a magnification of about 40× and a planatic image field even in the wide field of view.

The immersion microscope objective lens system of the present invention has an object side and an image side and comprises: a plurality of at least five lens groups G1 through G5 arranged along a common optical axis from the object to said image side thereof wherein the first lens group G1 from the object side of the lens system includes a planoconvex lens and a meniscus lens cemented to the planoconvex lens with its convex surface facing toward the image side of the lens system and wherein the second lens group G2 includes two positive meniscus lenses having convex surfaces facing toward the image side of the lens system and wherein the following condition is fulfilled: that n2 is larger than 1.70 where n2 is the refractive index in relation to the "d" line of the meniscus lens of the first lens group G1 ($\lambda$=587.6 nm).

The immersion microscope objective lens system of the present invention should preferably include eight lens groups G1 through G8 arranged along a common optical axis from the object to said image side thereof with the lens system comprising from the object side:

a first lens group G1 comprising a planoconvex lens and a meniscus lens which is cemented to the planoconvex lens with its convex surface facing toward the image side of the lens system;

a second lens group G2 comprising two positive meniscus lenses having convex surfaces facing toward the object side of the lens system;

a third lens group G3 comprising a negative lens and a positive lens cemented together;

a fourth lens group G4 comprising a negative lens and a positive lens cemented together;

a fifth lens group G5 comprising a compound lens containing a negative lens, a positive lens and a negative lens;

a sixth lens group G6 comprising a compound lens containing a positive lens and a negative lens and having a convex surface facing toward the object side of the lens system;

a seventh lens group G7 comprising a compound lens including a positive lens and a negative lens and having a convex surface facing toward the image side of the lens system; and an eighth lens group G8 which is a positive meniscus lens having its convex surface facing toward the image side;
wherein the immersion microscope objective lens system satisfies the following condition: that n2 is larger than 1.70 in which:
n2 is the refractive index in relation to the "d" line of the meniscus lens of the first lens group G1 ($\lambda$=587.6 nm).

DESCRIPTION OF THE PREFERRED EMBODIMENT

Figure 1:
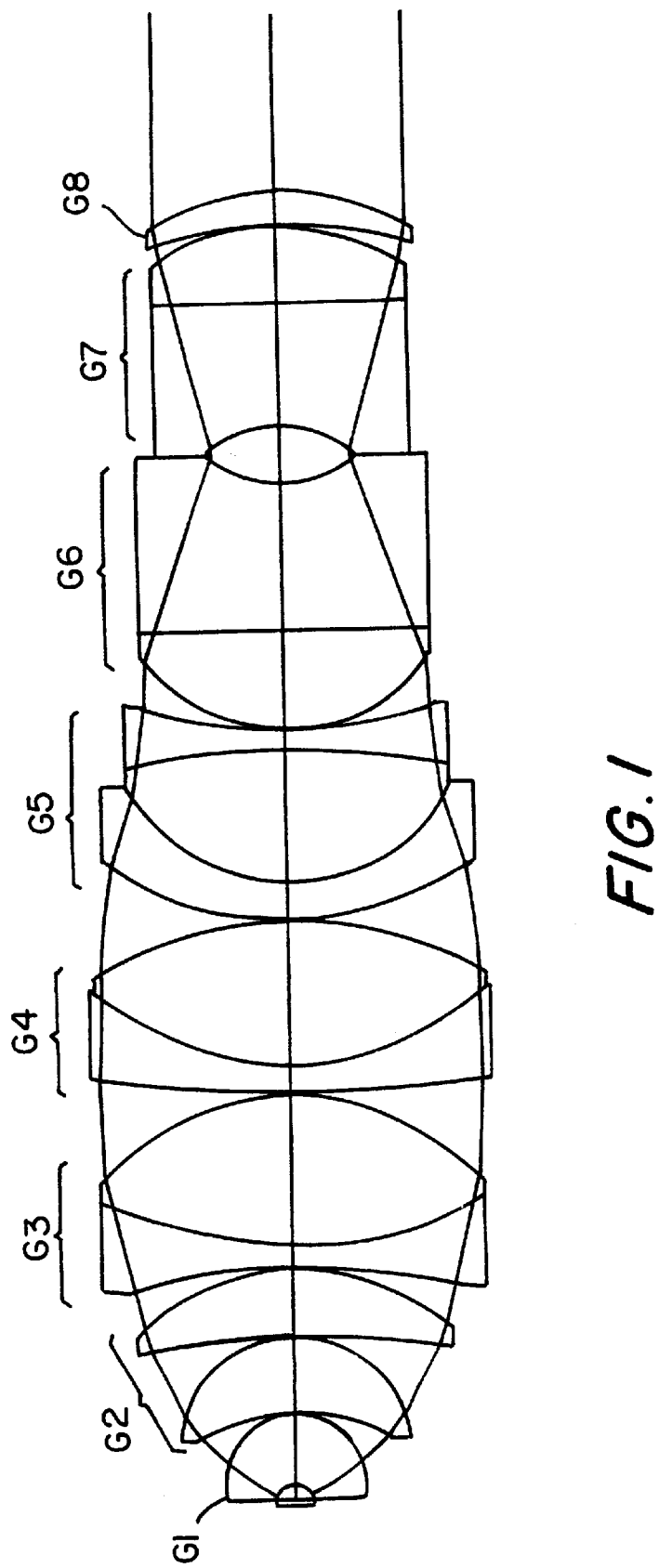
FIG. 1 shows the lens arrangement of a preferred embodiment of the present invention.
Figure 2:
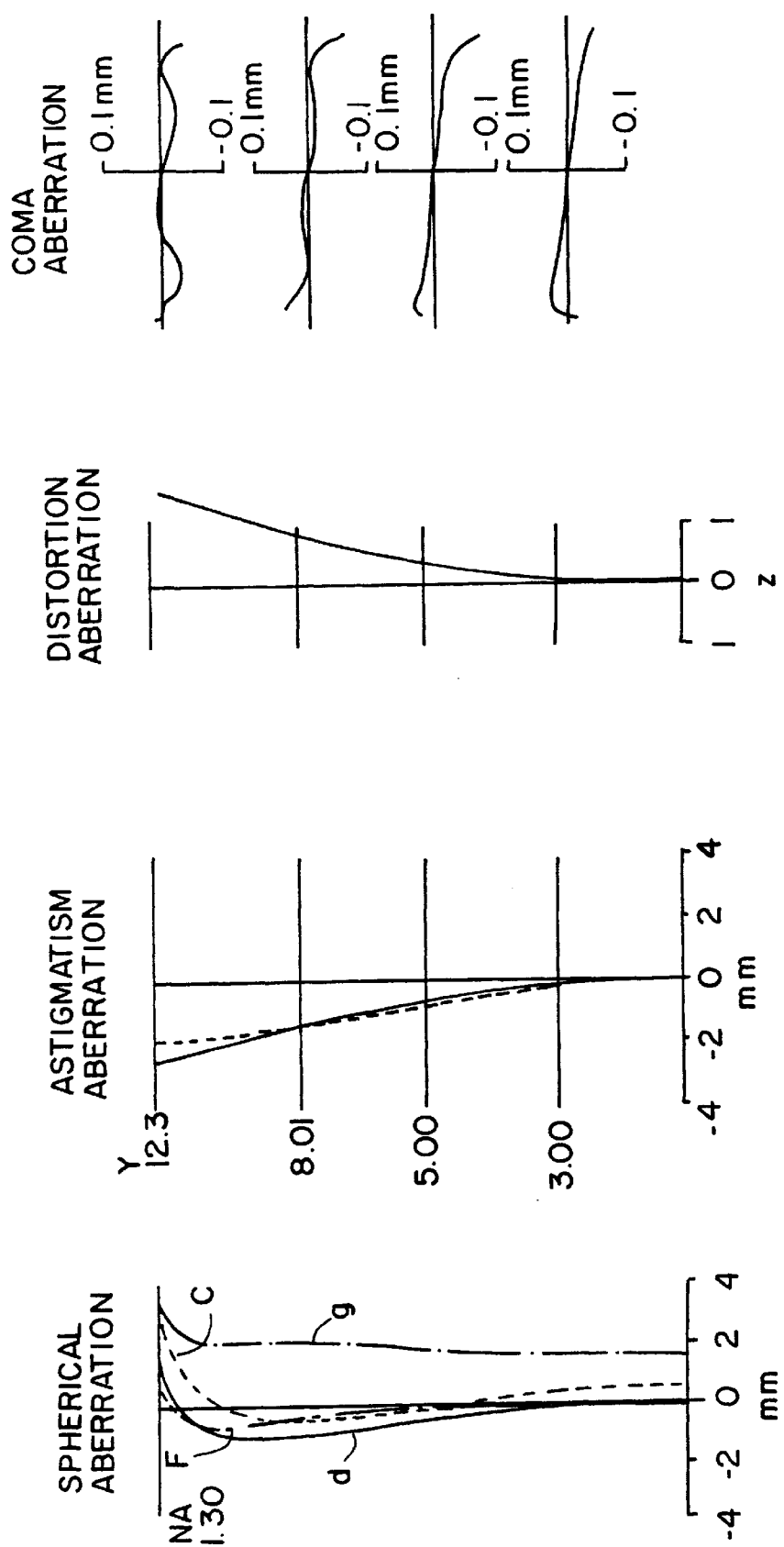
FIG. 2 shows the aberrations for the embodiment of FIG. 1 of the present invention.
Figure 3:
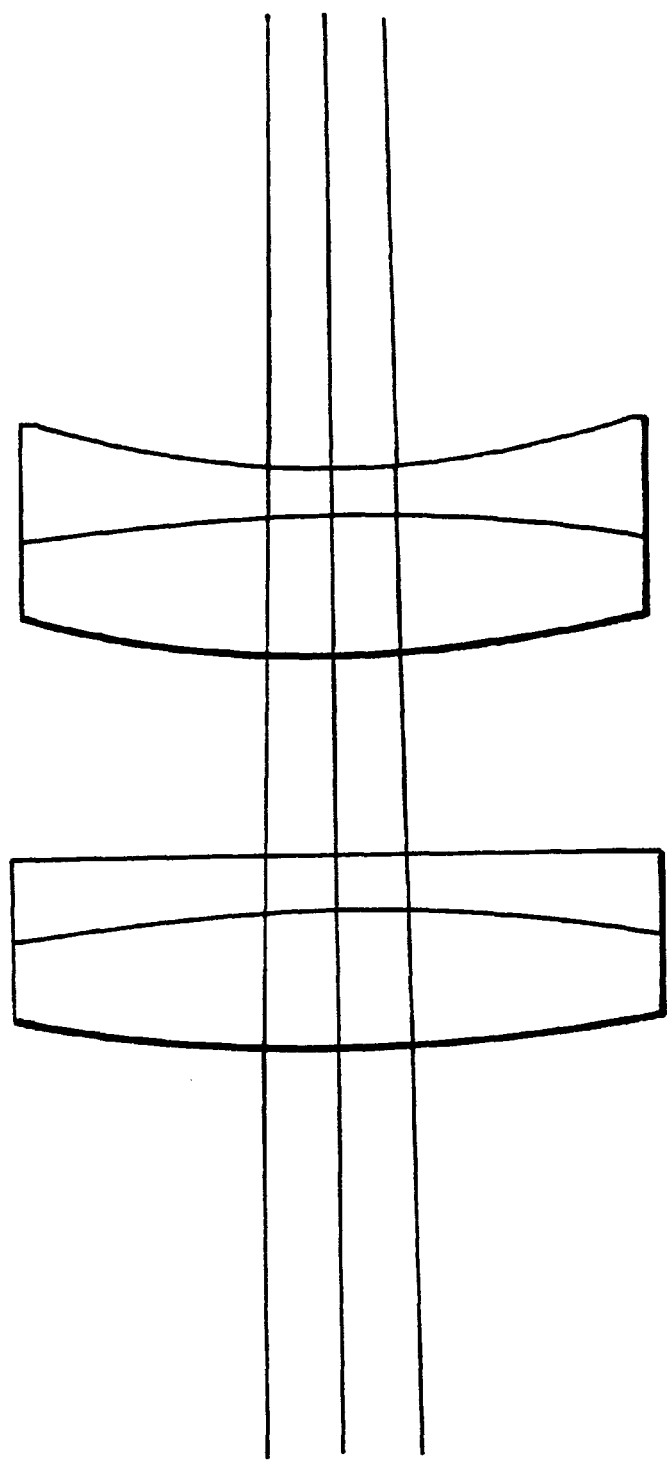
FIG. 3 shows a structure of an imaging lens which is used in combination with an embodiment of the present invention.

A preferred embodiment of the immersion lens system of the present invention is shown in FIG. 1 and comprises a structure including a plurality of at least five lens groups G1 through G5 and preferably eight lens groups G1 through G8 arranged along a common optical axis wherein the first lens group G1 from the object side of the lens system includes a planoconvex lens and a meniscus lens cemented to the planoconvex lens with its convex surface facing toward the image side of the lens system and wherein the second lens group G2 includes two positive meniscus lenses having convex surfaces facing toward the object side of the lens system and wherein the following condition is fulfilled: that n2 is larger than 1.70 where n2 is the refractive index in relation to the "d" line of the meniscus lens of the first lens group G1 ($\lambda$=587.6 nm)(hereafter Condition 1).

In the case of an immersion microscope objective lens system with a large numerical aperture composed of a plurality of lens groups such as in the present invention, the lens system shall satisfy the general requirement that:

the objective lens comprises a spherical lens group G1 arranged closest to the object side of the lens system having two lenses with one lens in the lens group G1 closest to the object side having a refractive index almost equal to that of a microscope cover glass and the immersion medium and further that the lens group G1 satisfy aplanatic conditions on the surface closest to the objective side in relation to the objective point on the optical axis; and that about half of the refractive power which the objective lens system has is produced by one lens group.

The effects of the above spherical lens group is significant with this lens group being essential to an immersion microscope objective lens having a large numerical aperture. Nonetheless, the above spherical lens group satisfies the aplanatic conditions for light of only a specific wave length and will not satisfy the aplanatic conditions for light of other wave lengths. Therefore, the lens group causes spherical aberration of colors as well as chromatic aberration. These aberrations are directly proportional to the size of the spherical lens such that a smaller spherical lens is preferred in terms of compensating for chromatic and spherical aberrations. On the other hand, a small spherical lens causes the Petzval sum to increase in the positive direction such that planaticity of the image field deteriorates. Designing an immersion microscope objective lens system of this kind is always accompanied with the requirements to compensate for chromatic and spherical aberrations and the contradictory requirements to compensate for the Petzval sum. This issue is especially remarkable in an immersion microscope objective lens with a large numerical aperture such as in the present invention.

The present invention satisfies Condition (1) with n2 larger than 1.70 in which n2 is equal to the refractive index in relation to the "d" line of the meniscus lens of the first lens group G1 ($\lambda$=587.6 nm) by having the lens groups G1 through G5 compensate for chromatic and spherical aberation as well as planaticity of the image field.

The following Conditions (1) through (7) are all preferably satisfied by the immersion microscope objective lens system of the present invention.

Condition 1 must be satisfied to obtain appropriate values for the Petzval sum. When Condition 1 is not satisfied, the Petzval sum becomes large and as a result, the curvature field increases with the result that proper anastigmatism is difficult to obtain.

Additionally, it is preferable in the present invention that the value resulting from the subtraction of n1 from n2 be larger than 0.18 where n1 is the refractive index in relation to the d line of said planoconvex lens of said first lens group G1 ("Condition 2" hereafter).

Furthermore, it is preferable in the present invention that an absolute value of R2 be larger than 0.9D and smaller than 1.5D where:

D is a distance between an object and the cemented surface of the first lens group G1 along the optical axis; and R2 is the radius of curvature of the cemented surface of the first lens group G1 ("Condition 3" hereafter).

Condition 2 defines appropriate ranges for the differences in the refractive indices of the two lenses which constitute the first lens group G1. Condition 2 is also, in relation with Condition 3, used to compensate the Petzval sum to obtain a planatic image field. Therefore, the larger the difference in the refractive indices, the more effective the immersion microscope objective lens system becomes. When Condition 2 is not satisfied, the compensation effect of the Petzval sum decreases and the curvature of the field increases.

Condition 3 defines appropriate ranges for the radius of curvature on the cemented surface of the lens group G1. When an absolute value of R2 is 1.5D, the upper limit of Condition 3, is exceeded, compensation of the Petzval sum is not complete and the curvature of field deteriorates. On the other hand, when an absolute value of R2 is 0.9D, the lower limit of Condition 3, is exceeded which is advantageous for compensation of the Petzval sum, that is, compensation of the curvature of field. Nonetheless, large curvature of the cemented surface causes a strong diverging effect on light beams such that compensation of spherical and coma aberrations becomes difficult.

Moreover, the first lens group G1 comprises a planoconvex lens and a meniscus lens, which has its convex surface facing toward the image side. These lenses are cemented together in order to compensate for the Petzval sum and at the same time, to satisfy Conditions 1, 2 and 3.

Additionally, it is preferable that in the present invention each of $\nu 3p$, $\nu 4p$ and $\nu 5p$ be larger than 80 ("Condition 4" hereafter) where:

$\nu 3p$ is the Abbe number of said positive lens of the third lens group;

$\nu 4p$ is the Abbe number of said positive lens of the fourth lens group; and $\nu 5p$ is the Abbe number of said positive lens of the fifth lens group.

As shown in the FIG. 1 the lenses are arranged such that following the first lens group G1 from the object side is a second lens group G2, which has two positive meniscus lenses, a third lens group G3 which has a compound of lenses, a fourth lens group G4 and a fifth lens group G5. These lens groups mainly compensate for spherical and chromatic aberrations. Also, in order to reduce the second spectrum, the positive lenses of lens groups G3, G4 and G5 participate to satisfy Condition 4. If Condition 4 is not satisfied, the second spectrum increases and achromatism will not be achieved.

In general, only lens material with low spontaneous fluorescence can be used for fluorescence observations, thus, it is difficult to appropriately compensate for chromatic aberration. However, the structural arrangement of lens groups G1 through G5 enables compensation of aberrations at the achromatic level.

Additionally, it is preferable that in the present invention the value resulting from the division of R18 by R20 be larger than 1.5 and smaller than 2.5, wherein:

R18 is the radius of curvature of the convex surface which is the closest to the object side in said sixth lens group; and R20 is the radius of curvature of the concave surface which is the closest to the image side in the sixth lens group ("Condition 5" hereafter).

Following the lens groups G3, G4 and G5 are three additional lens groups G6 through G8. This structure is called a Gauss type. In this structure, the positive meniscus lens G8 participates in the refractive power having the convex surface on the image side in the lens group G7 and essentially belongs to the seventh lens group G7. Lens groups G6 and G7 are symmetrically positioned in relation to the spatial distance between them and are characterized in that, among the aberrations generated in each lens groups, the aberrations which are classified as lateral aberrations cancel out each other between lens groups G6 and G7. At the same time, lens groups G3–G8 enable appropriate compensation of the Petzval sum so that the curvature of field is appropriately compensated for. Hence, it is preferable that the refractive power of lens group G6 and the combined refractive power of lens groups G7 and G8 are not significantly strong and that the thickness at the center of lens groups G6 and G7 be relatively thick in order to appropriately compensate the Petzval sum. Nonetheless, the entire length of the immersion microscope objective lens system is limited, thus, the thickness at the center is also limited.

As a result, it is desirable that Condition 5 be satisfied in order to obtain an appropriate thickness at the center of lens group G6. If the lower limit of Condition 5 is exceeded, the Petzval sum is not appropriately compensated for and the curvature of field will increase. On the other hand, if the upper limit of Condition 5 is exceeded, the Petzval sum is compensated for but the thickness at the center of lens group G6 becomes too thick and the limit for the entire length of the objective will be exceeded.

It is also preferable that lens group G6 of the present invention satisfy the following Condition 6 in which the value resulting from dividing f by f6 should be larger than −0.1 and smaller than 2.5 where:

f is the focal distance of the entire immersion microscope objective lens system; and f6 is the focal distance of the lens group G6.

Condition 6 defines appropriate ranges for the refractive power of the lens group G6. When the upper and lower limits of Condition 6 are exceeded, the lens group G6 has a strong positive or negative refractive power, which makes compensation of aberrations difficult.

Additionally, it is preferable that the lens group G7 of the present invention satisfy either of the following (hereafter Condition 7):

(1) ν7p is smaller than 50; or
(2) ν8p is smaller than 50;
wherein:

ν7p is the Abbe number of said positive lens of said seventh group G7; and

ν8p is the Abbe number of the eighth lens group G8.

Condition 7 defines that the Abbe numbers of either the positive lens in the seventh lens group G7 or of the eighth lens group G8 are preferably smaller than 50. In other words, the effect of reverse achromatism is provided in the last two lens groups of the Gauss type. Chromatic aberration on the optical axis is over-compensated for in the lens groups G1–G6 and is balanced in lens groups G7 and G8. Overall, lateral chromatic aberration is compensated for. When Condition 7 is not satisfied, a positive lens needs to be positioned close to lenses of crown types. Therefore, the negative lens in G7 must be positioned closer to the crown types in order to obtain the reverse achromatic effect. As a result, both positive and negative lenses tend to be positioned closer to the crown side which causes the Abbe numbers to increase. Thus, the amount of lateral chromatic aberration to be compensated for decreases and the compensation remains incomplete.

EXAMPLE

The following Table 1 shows original values and values corresponding to each condition of the embodiment of FIG. 1. FIG. 1 is an immersion microscope objective lens system for use in fluorescence observations having magnifications of 40× and a NA of 1.3. In Table 1 β indicates magnification, F focal distance, WD working distance and the numbers on the left side indicate the order of the lenses from the objective end. The refractive indexes and Abbe numbers are shown in relation to the d line (λ=587.6 nm).

TABLE 1

β = 40X　　F = 4.89　　WD = 0.2
Thickness of cover glass = 0.1　NA = 1.3

| | Radius of Curvature r | Surface Separation d | Index of refraction n | Abbe Number fE |
|---|---|---|---|---|
| 1 | — | 0.65 | 1.52 | 58.90 |
| 2 | −1.0508 | 3.35 | 1.77 | 50.22 |
| 3 | −3.5214 | 0.10 | | |
| 4 | −9.9147 | 3.35 | 1.50 | 82.52 |
| 5 | −6.1507 | 0.10 | | |
| 6 | −47.0780 | 3.40 | 1.50 | 82.52 |

TABLE 1-continued

| | | | | |
|---|---|---|---|---|
| 7 | −12.0508 | 0.10 | | |
| 8 | −30.7700 | 1.10 | 1.55 | 45.87 |
| 9 | 22.1996 | 7.30 | 1.43 | 95.25 |
| 10 | −13.3198 | 0.10 | | |
| 11 | 68.8520 | 1.30 | 1.61 | 44.41 |
| 12 | 15.0998 | 7.05 | 1.43 | 92.25 |
| 13 | −20.3123 | 0.05 | | |
| 14 | 17.3355 | 1.85 | 1.71 | 53.93 |
| 15 | 9.5626 | 6.45 | 1.43 | 95.25 |
| 16 | −43.6930 | 1.10 | 1.50 | 56.41 |
| 17 | 25.2860 | 0.10 | | |
| 18 | 9.5077 | 4.85 | 1.50 | 82.52 |
| 19 | 1999.5000 | 7.10 | 1.53 | 51.35 |
| 20 | 5.2034 | 3.05 | | |
| 21 | −5.4879 | 6.10 | 1.77 | 50.22 |
| 22 | −128.0350 | 3.75 | 1.55 | 45.87 |
| 23 | −12.0994 | 0.10 | | |
| 24 | −20.7999 | 1.70 | 1.58 | 40.76 |
| 25 | −12.0994 | | | |

(Values Corresponding to the Condition)

(1) n2=1.77
(2) n2−n1=0.25
(3) R2=1.0508
(4) ν3p=95.25
  ν4p=95.25
  ν5p=95.25
(5) R18/R20=1.83
(6) f/f6=0.03
(7) ν7p=45.78
(8) ν8p=40.76

TABLE 2

| | Radius of Curvature r | Surface Separation d | Index of Refraction n | Abbe Number ν |
|---|---|---|---|---|
| 1 | 75.043 | 5.10 | 1.62 | 57.03 |
| 2 | −75.043 | 2.00 | 1.75 | 35.19 |
| 3 | 1600.58 | 7.50 | 1.00 | |
| 4 | 50.256 | 5.10 | 1.67 | 41.96 |
| 5 | −84.541 | 1.80 | 1.61 | 44.41 |
| 6 | 36.911 | | | |

The immersion microscope objective lens system of the present invention, as described above, provides high brightness has a numerical aperture of 1.3, a magnification of about 40×, a planatic image field even in the wide field of view and a superior imaging ability.

What is claimed is:

1. An immersion microscope objective lens system having an object side and an image side comprising: a plurality of at least five lens groups G1 through G5 arranged along a common optical axis from said object to said image side thereof wherein the first lens group G1 from the object side of the lens system includes a planoconvex lens and a meniscus lens cemented to the planoconvex lens with its convex surface facing toward the image side of the lens system and wherein the second lens group G2 includes two positive meniscus lenses having convex surfaces facing toward the image side of the lens system and wherein the following condition is fulfilled: that n2 is larger than 1.70 where n2 is the refractive index in relation to the "d" line of the meniscus lens of the first lens group G1 (λ=587.6 nm).

2. An immersion microscope objective lens system as defined in claim 1 comprising eight lens groups G1 through G8 wherein the third lens group G3 comprises a negative lens and a positive lens cemented together;

the fourth lens group G4 comprises a negative lens and a positive lens cemented together;

the fifth lens group G5 comprises a compound lens which contains a negative lens, a positive lens and a negative lens;

the sixth lens group G6 comprises a compound lens which contains a positive lens and a negative lens and which has its convex surface facing toward said object side;

the seventh lens group G7 comprises a compound lens which contains a positive lens and a negative lens and which has its convex surface facing toward said image side; and the eighth lens group G8 is a positive meniscus lens having its convex surface facing toward said image side.

3. The immersion microscope objective lens group of claim 2, wherein a value resulting from a subtraction of n1 from n2 is larger than 0.18 where n1 is a refractive index in relation to said "d" line of said planoconvex lens of said first lens group.

4. The immersion microscope objective lens system of claim 2, wherein an absolute value of R2 is larger than 0.9D and smaller than 1.5D wherein:

D is a distance between an object to the cemented surface of said first lens group along said optical axis; and R2 is a radius of curvature of said cemented surface of said first lens group.

5. The immersion microscope objective lens system of claim 2, wherein each of v3p, v4p and v5p is larger than 80 in which:

v3p is the Abbe number of said positive lens of said third lens group;

v4p is the Abbe number of said positive lens of said fourth lens group; and v5p is the Abbe number of said positive lens of said fifth lens group.

6. The immersion microscope objective lens group of claim 2, wherein a value resulting from dividing R18 by R20 is larger than 1.5 and smaller than 2.5 in which:

R18 is a radius of curvature of a convex surface which is closest to said object side in said sixth lens group; and R20 is a radius of curvature of a concave surface which is the closest to said image side in said sixth lens group.

7. The immersion microscope objective lens system of claim 2, wherein a value resulting from dividing f by f6 is larger than −0.1 and smaller than 2.5 in which:

f is a focal distance of said immersion microscope objective lens system; and f6 is a focal distance of said sixth lens group.

8. The immersion microscope objective lens system of claim 2, wherein:

v7p is smaller than 50 in which:

v7p is an Abbe number of said positive lens of said seventh group.

9. The immersion microscope objective lens system of claim 3, wherein an absolute value of R2 is larger than 0.9D and smaller than 1.5D in which:

D is a distance between an object to the cemented surface of said first lens group along said optical axis; and R2 is a radius of curvature of said cemented surface of said first lens group.

10. The immersion microscope objective lens system of claim 9, wherein each of v3p, v4p and v5p is larger than 80 in which:

v3p is the Abbe number of said positive lens of said third lens group;

v4p is the Abbe number of said positive lens of said fourth lens group; and v5p is the Abbe number of said positive lens of said fifth lens group.

11. The immersion microscope objective lens group of claim 10, wherein a value resulting from dividing R18 by R20 is larger than 1.5 and smaller than 2.5 in which:

R18 is a radius of curvature of a convex surface which is closest to said object side in said sixth lens group; and R20 is a radius of curvature of a concave surface which is the closest to said image side in said sixth lens group.

12. The immersion microscope objective lens system of claim 11, wherein a value resulting from dividing f by f6 is larger than −0.1 and smaller than 2.5 in which:

f is a focal distance of said immersion microscope objective lens system; and f6 is a focal distance of said sixth lens group.

13. The immersion microscope objective lens system of claim 12, wherein v7p is smaller than 50 in which:

v7p is an Abbe number of said positive lens of said seventh group.

14. The immersion microscope objective lens system of claim 13, wherein v7p is smaller than 50 in which:

v7p is an Abbe number of said positive lens of said seventh group G7.

15. The immersion microscope objective lens system of claim 14, wherein v8p is smaller than 50 in which:

v8p is an Abbe number of said eighth lens group.

* * * * *

UNITED STATES PATENT AND TRADEMARK OFFICE
CERTIFICATE OF CORRECTION

PATENT NO. : 5,982,559  
DATED : November 9, 1999  
INVENTOR(S) : Fukutake

Page 1 of 1

It is certified that error appears in the above-identified patent and that said Letters Patent is hereby corrected as shown below:

[75] Inventor: Naoki Fukutake

Signed and Sealed this

Twenty-first Day of August, 2001

*Attest:*

*Attesting Officer*

NICHOLAS P. GODICI  
*Acting Director of the United States Patent and Trademark Office*